United States Patent
Leicht

(10) Patent No.: US 9,724,748 B2
(45) Date of Patent: Aug. 8, 2017

(54) SYSTEM AND METHOD OF MAKING A FORGED PART

(71) Applicant: ArvinMeritor Technology, LLC, Troy, MI (US)

(72) Inventor: Phillip Leicht, South Lyon, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 119 days.

(21) Appl. No.: 14/456,122

(22) Filed: Aug. 11, 2014

(65) Prior Publication Data

US 2016/0038994 A1     Feb. 11, 2016

(51) Int. Cl.

| | |
|---|---|
| *B21J 15/02* | (2006.01) |
| *B21J 9/02* | (2006.01) |
| *B21K 1/30* | (2006.01) |
| *B21J 5/00* | (2006.01) |
| *B21J 5/02* | (2006.01) |
| *F16H 57/04* | (2010.01) |

(52) U.S. Cl.
CPC ............ *B21J 5/025* (2013.01); *B21J 9/022* (2013.01); *B21K 1/305* (2013.01); *F16H 57/0483* (2013.01); *B21J 5/008* (2013.01); *Y10T 29/49474* (2015.01)

(58) Field of Classification Search
CPC ... B21J 5/008; B21J 9/022; B21J 5/025; B21J 5/12; B21J 9/02; B21K 1/30–1/305; B21D 53/28; Y10T 29/49462; Y10T 29/49467; Y10T 29/49474; Y10T 29/49478
See application file for complete search history.

(56) References Cited

U.S. PATENT DOCUMENTS

| | | | |
|---|---|---|---|
| 537,577 A | 4/1895 | Mason | |
| 3,429,172 A * | 2/1969 | Lierse | B21K 1/30 72/344 |
| 4,362,043 A | 12/1982 | Hanson | |
| 4,571,977 A | 2/1986 | Ueno et al. | |
| 4,697,688 A * | 10/1987 | Kimbell | B21D 22/08 198/346.2 |
| 4,709,569 A * | 12/1987 | Sabroff | B21J 1/06 72/340 |
| 4,748,708 A * | 6/1988 | Schlicht | B21K 19/00 470/192 |
| 4,939,829 A * | 7/1990 | Maki | B21K 1/30 29/893.34 |
| 5,946,963 A * | 9/1999 | Suzuki | B21K 1/30 29/893.34 |
| 6,041,640 A * | 3/2000 | McInerney | B21K 1/30 29/893.34 |
| 6,457,342 B2 * | 10/2002 | Tanahashi | B21J 1/06 72/342.1 |

(Continued)

OTHER PUBLICATIONS

U.S. Appl. No. 13/752,844, filed Jan. 29, 2013.

*Primary Examiner* — Christopher Besler
*Assistant Examiner* — Matthew P Travers
(74) *Attorney, Agent, or Firm* — Brooks Kushman P.C.

(57) ABSTRACT

A system and method of making a forged part. The method may include forming a workpiece in a first die unit that may be disposed in a first press, transferring the workpiece to a tooth forming die unit that may be disposed in a second press, and forming the workpiece into the forged part by forming a set of teeth on the workpiece with the tooth forming die unit.

15 Claims, 3 Drawing Sheets

(56) References Cited

U.S. PATENT DOCUMENTS

| | | | | |
|---|---|---|---|---|
| 7,946,033 B2* | 5/2011 | Gibellini | ............... | B21J 9/022 29/33 M |
| 2015/0275325 A1* | 10/2015 | Tseng | ............... | C21D 9/0056 118/712 |

* cited by examiner

SYSTEM AND METHOD OF MAKING A FORGED PART

TECHNICAL FIELD

This patent application relates to a system and method of making a forged part, such as a drive pinion.

BACKGROUND

A system and method of making a forged part is disclosed in U.S. patent application Ser. No. 13/752,844.

SUMMARY

In at least one embodiment, a method of making a forged part is provided. The method may include forming a workpiece in a first die unit that is disposed in a first press, transferring the workpiece from the first die unit to a tooth forming die unit that is disposed in a second press, and forming the workpiece into the forged part by forming a set of teeth on the workpiece with the tooth forming die unit.

In at least one embodiment, a method of making a forged part is provided. The method may include forming a workpiece into a toothless drive pinion that has a stem and an enlarged head that extends from the stem with a first die unit that is disposed in a first press, transferring the toothless drive pinion from the first die unit to a tooth forming die unit that is disposed in a second press, and forming the toothless drive pinion into the forged part by forming a set of teeth on the enlarged head with the tooth forming die unit.

In at least one embodiment, a system for making a forged part is provided. The system may include a first press and a first die unit that may be disposed in the first press. The first die unit may include a first die assembly, a second die assembly, and a third die assembly that sequentially form a workpiece into a toothless drive pinion. A second press may also be provided that may be independently operable from the first press. A tooth forming die unit may receive the toothless drive pinion and may form a set of teeth on the toothless drive pinion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
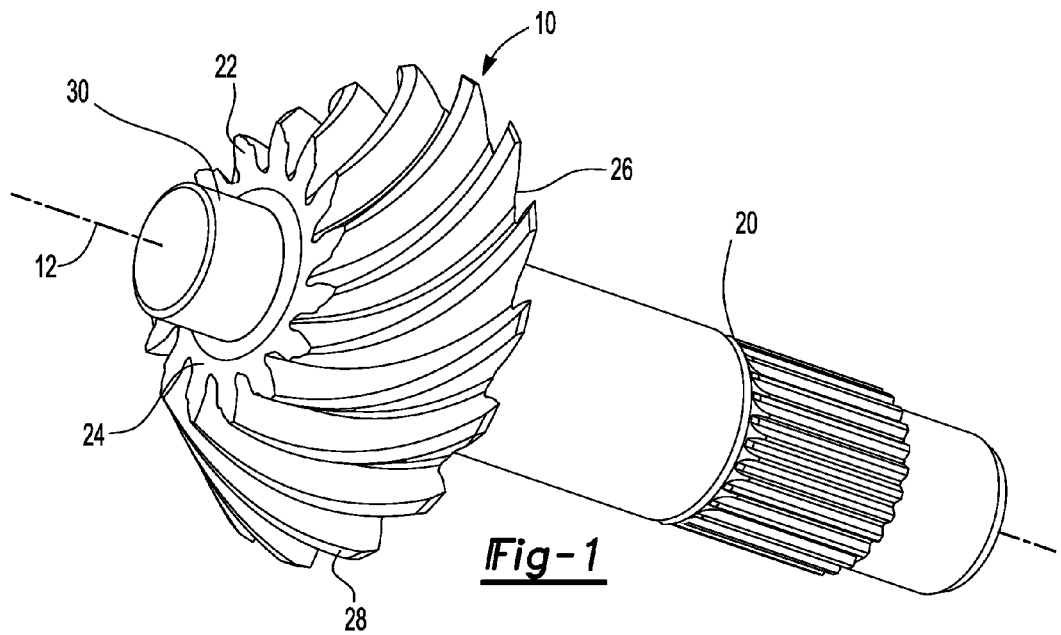
FIG. 1 is a perspective view of an exemplary forged part configured as a drive pinion.

Referring to FIG. 1, an example of a forged part 10 is shown. The forged part 10 may extend along an axis 12 and may be made of any suitable metal material, such as a metal alloy like steel. In FIG. 1, the forged part 10 is configured as a drive pinion that may transmit torque to a gear, such as a ring gear. Such a drive pinion may be a unitary or one piece forging that may be part of a vehicle drivetrain component that may provide torque to or one or more vehicle traction wheels, such as a drive axle assembly, transfer case, or differential. The vehicle drivetrain component may be provided with a motor vehicle like a truck, bus, farm equipment, military transport or weaponry vehicle, or cargo loading equipment for land, air, or marine vessels.

The forged part 10 may have a non-tubular configuration and may be formed or forged without holes such as through holes. The forged part 10 may have a stem 20 and a gear portion 22 when configured as a drive pinion.

The stem 20 may extend along or may be disposed along the axis 12 and may have multiple circumferential surfaces that may have different diameters and that may form at least a portion of an exterior surface of the stem 20.

The gear portion 22 may be disposed at an end of the stem 20. The gear portion 22 may extend outwardly from the gear portion 22 and may have anterior surface 24 and a posterior surface 26. The anterior surface 24 may be disposed proximate an end of the drive pinion that may be disposed opposite the stem 20. The posterior surface 26 may be disposed opposite the anterior surface 24 and may extend from the stem 20. The anterior surface 24 and/or the posterior surface 26 may be disposed substantially perpendicular to the axis 12 in one or more embodiments. The gear portion 22 may generally have a tapered conical configuration that may become progressively narrower or become closer to the axis 12 in a direction that extends from the posterior surface 26 toward the anterior surface 24. The gear portion 22 may include a set of teeth 28. The set of teeth 28 may be arranged around the axis 12 and may extend between the anterior surface 24 and the posterior surface 26. In at least one embodiment, the set of teeth 28 may have a hypoid configuration. A protrusion 30 may be disposed along the axis 12 and may extend from the anterior surface 24 to facilitate mounting of the forged part 10 in a bushing or bearing.

Multiple presses and forging die units may be used to forge the part 10. Forging utilizes compressive force to shape a metal or metal alloy by plastic deformation in a die. Plastic deformation may be facilitated by heating the material being forged prior to the application of compressive force. Multiple presses may be used to provide improved forming of the material as compared to a single press. More specifically, using multiple presses that each have a corresponding die unit may help maintain load centering upon a workpiece during forging and may reduce or help avoid press wink or differentials in forming forces that may cause a press ram or upper portion of the press to move out of parallel with a press bolster or lower part of the press due to differentials in forming forces. As such, the use of multiple presses may allow each press to be independently balanced and may help improve the dimensional accuracy of the forged part.

Figure 2:
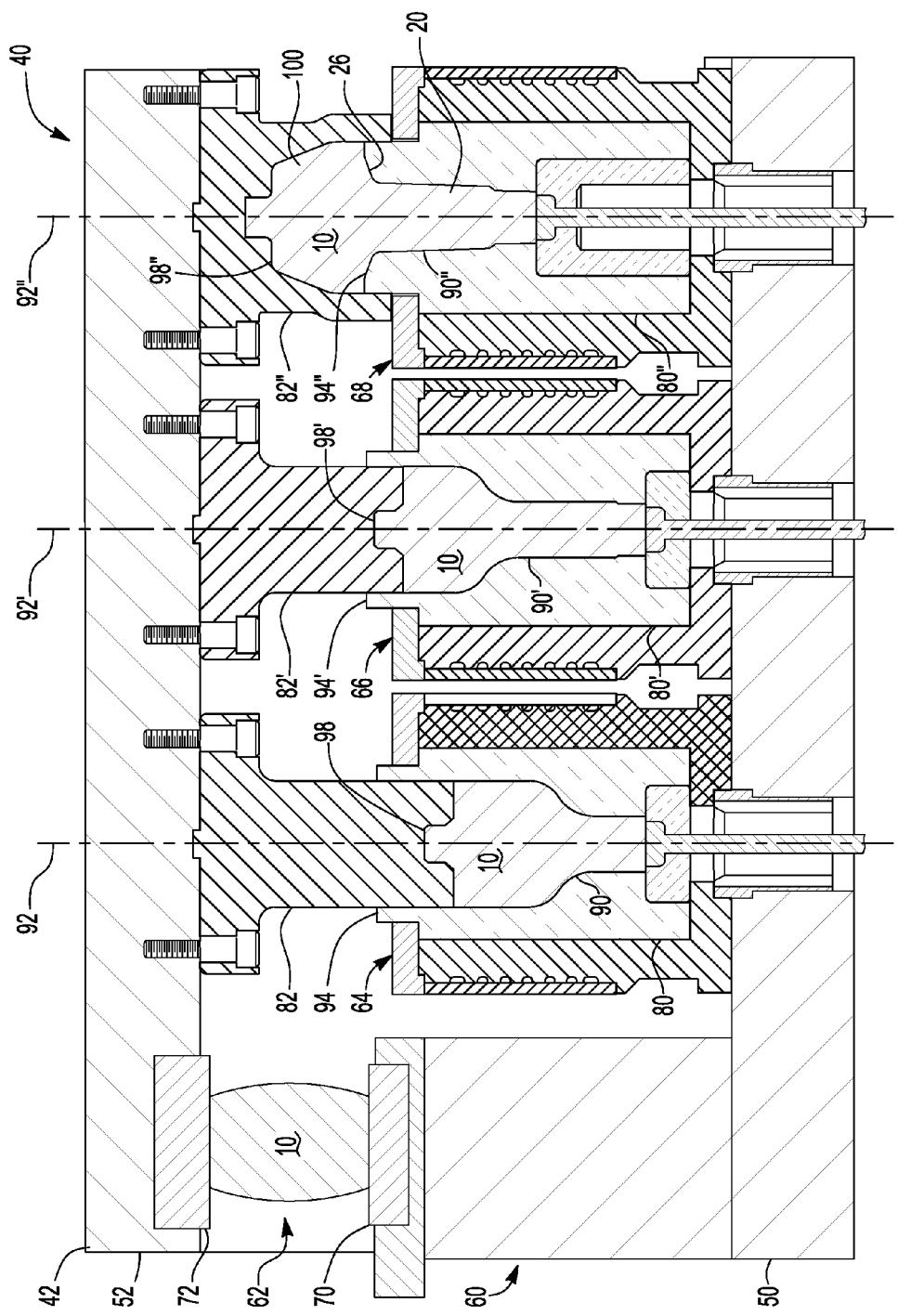
FIG. 2 illustrates a first press having a first die unit.
Figure 3:
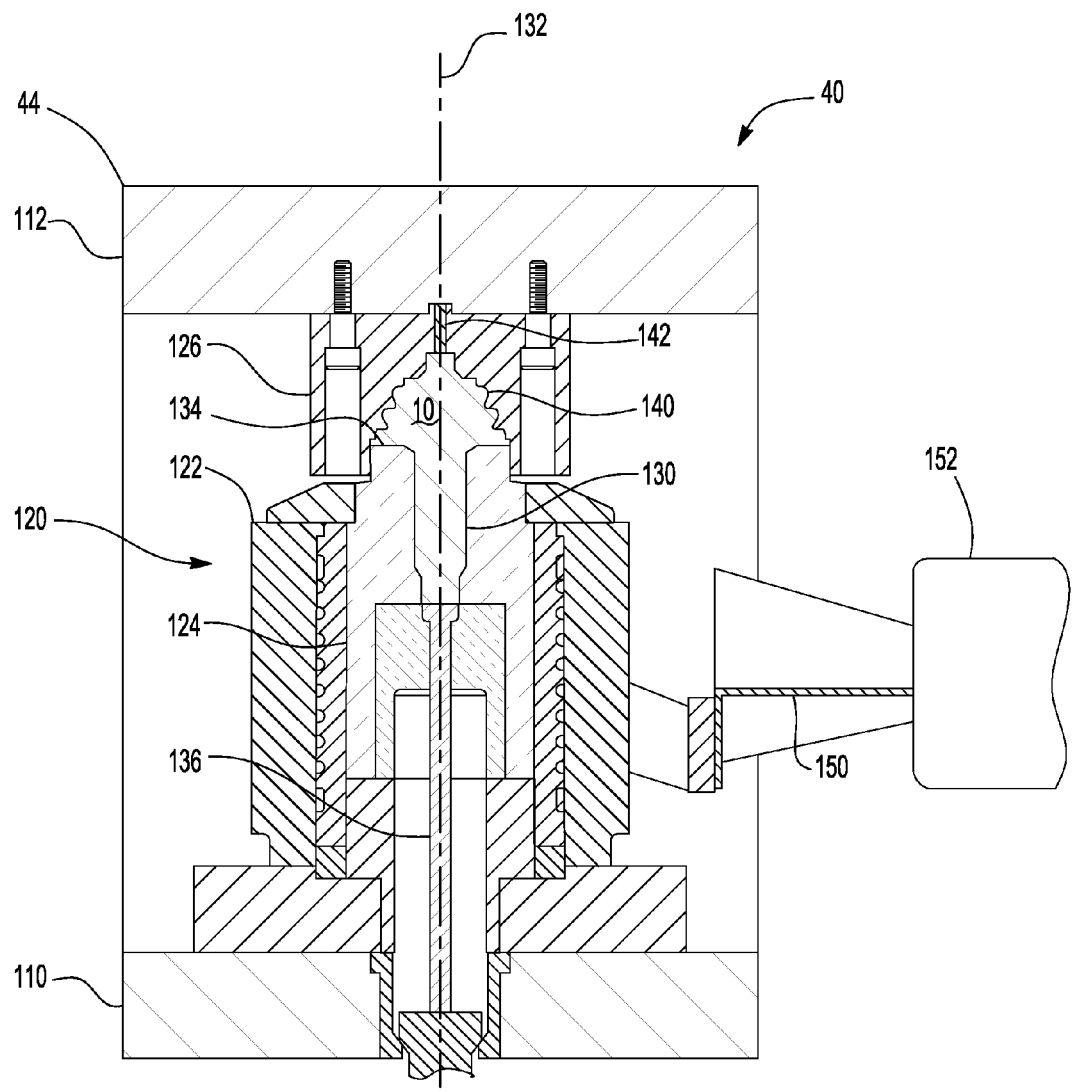
FIG. 3 illustrates a second press having a second die unit.

Referring to FIGS. 2 and 3, an exemplary system 40 for making a forged part is shown. The system 40 may include a first press 42 and a second press 44. The first press 42 and the second press 44 may be separate presses that may be independently operated. The first press 42 and the second press 44 may be of any suitable type, such as hydraulic presses. Moreover, the first press 42 and the second press 44 may each actuate a corresponding die unit in a linear direction or along a linear axis that may coincide with or extend parallel to the axis 12 of the part 10. For instance, each press may move between an open position and a closed position during an extending stroke and may move from the closed position to the open position during a retracting stroke. A die unit may have one or more die assemblies. In addition, each die unit may be provided with heating and/or cooling elements that may help control the die temperature, such as a water jacket.

Referring to FIG. 2, the first press 42 may include a first press bolster 50 and a first press ram 52. The first press bolster 50 may be mounted on a support surface and may be stationary in one or more embodiments. The first press ram 52 may be configured to move with respect to the first press bolster 50. For example, the first press ram 52 may be configured to move in a generally linear manner toward or away from the first press bolster 50.

The first press 42 may receive a first die unit 60. The first die unit 60 may include a plurality of die assemblies that may receive and forge a workpiece, such as a billet into a predetermined configuration. In the embodiment shown in FIG. 2, the first die unit 60 includes a billet bust portion 62, a first die assembly 64, a second die assembly 66, and a third die assembly 68, although it is contemplated that a greater or lesser number of die assemblies may be provided. Each die assembly may have a die and a punch. In FIG. 2, each die is illustrated as being fixedly positioned on the first press bolster 50 and each punch is positioned on the first press ram 52. Alternatively, the press may move a die with respect to a stationary punch or the press may actuate both the die and the punch in one or more embodiments.

The billet bust portion 62 may receive a workpiece, such a billet. A billet may be a semi-finished bar of a metallic material that may be provided in a predetermined size and form, such as a cylinder or rectangular prism. In this application, the terms workpiece and billet may be used to refer to material that is in the process of being manufactured into a forged part 10. For clarity in the Figures, reference number 10 may be used interchangeably to refer to the part in any stage of manufacture (i.e., reference number 10 may be used to reference a workpiece, billet, or forged part).

The billet may be heated to an elevated temperature prior to being positioned in the billet bust portion 62. For example, the billet may be heated and then positioned in the billet bust portion 62 with a manipulator, such as a robotic manipulator. The billet bust portion 62 may exert pressure on the billet to "bust" the billet, which may compress the billet and cause material to flake off of the exterior of the billet. More specifically, the billet may be positioned between a first plate 70 and a second plate 72 of the billet bust portion 62. The first plate 70 may be fixedly disposed on or fixedly positioned with respect to the first press bolster 50. The second plate 72 may be fixedly disposed on or fixedly positioned with respect to the first press ram 52. Actuation of the first press ram 52 toward the first press bolster 50 may cause the first plate 70 and the second plate 72 to engage and exert a compressive load on the billet.

The first die assembly 64 may be configured to form the workpiece 10 into a first configuration. The first die assembly 64 may include a first die 80 and a first punch 82.

The first die 80 may have a first die cavity 90 that may be configured to receive the workpiece. The first die cavity 90 may be disposed along a first die assembly axis 92 and may extend from an upper surface 94 of the first die 80 to a lower surface that may be disposed opposite the upper surface 94. In at least one embodiment, the first die cavity 90 may be substantially cylindrical near the upper surface 94 and may narrow to form a smaller substantially cylindrical shape near the lower surface that may begin to form the stem 20. One or more ejector pins 96 may be disposed proximate the lower surface and may at least partially define the lower surface. The ejector pins 96 may facilitate ejection or removal of the workpiece from the first die cavity 90. The depth of the first die cavity 90 or axial distance from the upper surface 94 to the lower surface or to the ejector pins 96 may be greater than the height of the workpiece to provide space to facilitate forging of the workpiece within the first die 80.

The first punch 82 may be configured to engage and exert force on the workpiece disposed in the first die cavity 90. In at least one embodiment, the first punch 82 may be generally cylindrical and may extend along the first die assembly axis 92. The first punch 82 may have a smaller diameter than the first die cavity 90 to facilitate insertion into the first die cavity 90. In addition, the first punch 82 may have a first punch cavity 98 that may help form the protrusion 30.

The second die assembly 66 may be configured to form the workpiece 10 into a second configuration that may differ from the first configuration. For example, the second configuration may have a greater axial length than the first configuration. The second die assembly 66 may include a second die 80' and a second punch 82'.

The second die 80' may have a second die cavity 90' that may be configured to receive the workpiece. The second die cavity 90' may be disposed along a second die assembly axis 92' and may extend from an upper surface 94' of the second die 80' to a lower surface that may be disposed opposite the upper surface 94'. In at least one embodiment, the second die cavity 90' may be substantially cylindrical near the upper surface 94' and may narrow to form a smaller substantially cylindrical shape near the lower surface that may continue to form the stem 20. One or more ejector pins 96' may be disposed proximate the lower surface and may at least partially define the lower surface. The ejector pins 96' may facilitate ejection or removal of the workpiece from the second die cavity 90'. The depth of the second die cavity 90' or axial distance from the upper surface 94' to the lower surface or to the ejector pins 96' may be greater than the height of the workpiece to provide space to facilitate forging of the workpiece within the second die 80'.

The second punch 82' may be configured to engage and exert force on the workpiece disposed in the second die cavity 90'. In at least one embodiment, the second punch 82' may be substantially cylindrical and may extend along the second die assembly axis 92'. The second punch 82' may have a smaller diameter than the second die cavity 90' to facilitate insertion into the second die cavity 90'. In addition, the second punch 82' may have a second punch cavity 98' that may receive or help form the protrusion 30.

The third die assembly 68 may be configured to form the workpiece into a third configuration that may differ from the first and second configurations. For example, the third configuration may have a greater axial length than the second configuration. This third configuration may be referred to as a toothless drive pinion. The third die assembly 68 may include a third die 80" and a third punch 82".

The third die 80" may have a third die cavity 90" that may be configured to receive the workpiece. The third die cavity 90" may be disposed along a third die assembly axis 92" and may extend from an upper surface 94" of the third die 80" to a lower surface that may be disposed opposite the upper surface 94". In at least one embodiment, the third die cavity 90" may be substantially cylindrical near the upper surface 94" and may narrow to form a smaller substantially cylindrical shape near the lower surface that may continue to form the stem 20. The third die 80" may form the posterior surface 26 of an enlarged head 100 that may extend from the stem 20. The enlarged head 100 may ultimately be formed or forged into the gear portion 22. One or more ejector pins 96" may be disposed proximate the lower surface and may at least partially define the lower surface. The ejector pins 96" may facilitate ejection or removal of the workpiece from the third die cavity 90". The depth of the third die cavity 90" or axial distance from the upper surface 94" to the lower surface or to the ejector pins 96" may not be greater than the height of the workpiece as the second punch 82' may provide additional space to facilitate forging of the workpiece.

The third punch 82" may be configured to engage and exert force on the workpiece disposed in the third die cavity 90". In at least one embodiment, the third punch 82" may be substantially cylindrical and may extend along the third die assembly axis 92". The third punch 82" may have a third punch cavity 98" that may receive the workpiece and a portion of the third die 80". For example, the third punch cavity 98" may form a remainder of the enlarged head 100. The enlarged head 100 may have a tapered conical shape that may be free of teeth. As such, the third die assembly 68 may not form the set of teeth 28 on the workpiece. The third punch cavity 98" may also receive and may help form the protrusion 30.

Referring to FIG. 3, the second press 44 may include a second press bolster 110 and a second press ram 112. The second press bolster 110 may be mounted on a support surface and may be stationary in one or more embodiments. The second press ram 112 may be configured to move with respect to the second press bolster 110. For example, the second press ram 112 may be configured to move in a generally linear manner toward or away from the second press bolster 110.

The second press 44 may receive a tooth forming die unit 120. The tooth forming die unit 120 may include a plurality of die assemblies that may receive and forge the workpiece or toothless drive pinion into a predetermined configuration. In the embodiment shown in FIG. 3, the tooth forming die unit 120 includes tooth forming die assembly 122 that may have a first tooth forming die portion 124 and a second tooth forming die portion 126.

The first tooth forming die portion 124 may be fixedly positioned on the second press bolster 110. The first tooth forming die portion 124 may have a first die cavity 130 that may be configured to receive the stem 20 of the workpiece. The first die cavity 130 may be disposed along a tooth forming die assembly axis 132 and may extend from an upper surface 134 of the first tooth forming die portion 124 to a lower surface that may be disposed opposite the upper surface 134. In at least one embodiment, the first die cavity 130 may be configured to hold the stem 20 in a stationary position and may inhibit rotation of the workpiece when the tooth forming die assembly 122 is actuated or opened. One or more ejector pins 136 may be disposed proximate the lower surface and may at least partially define the lower surface. The ejector pins 136 may facilitate ejection or removal of the workpiece from the first die cavity 130. In addition, the first die cavity 130 of the first tooth forming die portion 124 may have a substantially similar configuration as the third die cavity 90" of the third die 80" and may not further form the stem 20 in one or more embodiments.

The second tooth forming die portion 126 may be configured to engage and exert force on the workpiece. In at least one embodiment, the second tooth forming die portion 126 may extend along the tooth forming die assembly axis 132 and may have a second tooth forming die portion cavity 140 that may receive the workpiece and a portion of the first tooth forming die portion 124. For example, the second tooth forming die portion cavity 140 may receive the enlarged head 100 and form the set of teeth 28 on the enlarged head 100. The second tooth forming die portion cavity 140 may also receive and may help form the protrusion 30. The second tooth forming die portion 126 may also include a kickout pin 142 that may facilitate ejection or removal of the forged part from the second tooth forming die portion cavity 140.

The system 40 may also include a conveyor 150 and a controlled cooling unit 152.

The conveyor 150 may be disposed proximate the second press 44 and may receive the forged part when the forged part is removed or ejected from the tooth forming die unit 120. The conveyor 150 may transport the forged part to and/or through the controlled cooling unit 152.

The controlled cooling unit 152, which may also be referred to as a cooling tunnel, may cool the forged part in a predetermined manner. For instance, the controlled cooling unit 152 may receive the forged part and provide an environment that may have a predetermined temperature or predetermined temperature range. This predetermined temperature or temperature range may be set below the temperature at which the workpiece was forged and well above an ambient temperature. As an example, a predetermined temperature may be approximately 1200° F. with an associated tolerance range that may define a predetermined temperature range. As such, the controlled cooling unit 152 may keep the temperature of the part within the predetermined temperature range for a predetermined period of time. The controlled cooling unit 152 may be subsequently divided into one or more zones that have lower temperatures than the predetermined temperature or temperature range. For example, multiple temperature zones may be provided in series that may have progressively lower temperature ranges. These zones may receive the forged part and allow the forged part to continue to cool in a controlled manner or at a controlled rate.

Figure 4:
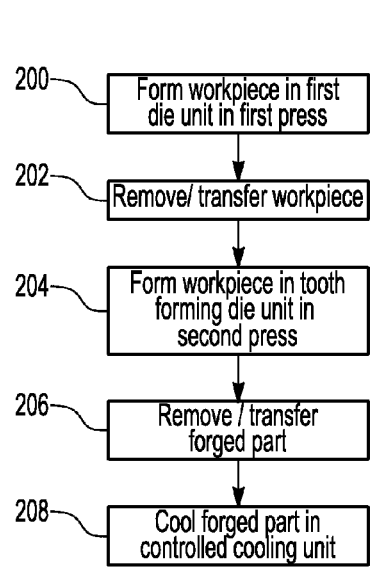
FIG. 4 is a flowchart of a method of making a forged part.

Referring to FIG. 4, an exemplary method of making a forged part is shown. The method may utilize the system 40 as described above.

At block 200, the workpiece may be formed or forged in the first press 42 with the first die unit 60. The workpiece may be provided in the form of a billet and may be preheated as previously discussed. The workpiece may be heated well above ambient temperature to facilitate plastic deformation or hot forging. For example, the workpiece may be heated above a recrystallization temperature of the material from which the workpiece is made to facilitate or permit plastic deformation to occur. The recrystallization temperature may be less than the melting temperature of the material. Additional details regarding forming or forging the workpiece in the first press 42 will be discussed in more detail with reference to FIG. 5 below.

At block 202, the workpiece or toothless drive pinion may be removed from the first die unit 60 and transferred to the second press 44 and the tooth forming die unit 120. The workpiece may be removed by opening the first die unit 60, such as by retracting the first press ram 52 away from the first press bolster 50. The workpiece may be transferred from the first die unit 60 to the tooth forming die unit 120 with a manipulator, such as a robotic manipulator that may have an end effector configured as a gripper for grasping the workpiece.

At block 204, the workpiece may be formed or forged in the tooth forming die unit 120 in the second press 44. For example, the workpiece may be received in the first die cavity 130 of the first tooth forming die portion 124. The second press 44 may be closed to actuate the second tooth forming die portion 126 toward the first tooth forming die portion 124. Pressure exerted by the first press ram 52 upon the workpiece may force the posterior surface 26 of the enlarged head 100 against the upper surface 134 of the first tooth forming die portion 124 and may force the enlarged head 100 against the surfaces that define the second tooth forming die portion cavity 140 to form or forge the set of teeth 28.

At block 206, the forged part may be removed from the second press 44 and the tooth forming die unit 120 and transferred to the conveyor 150. The forged part may be removed by opening the tooth forming die unit 120, such as by retracting the second press ram 112 away from the second press bolster 110. One or more components of the tooth forging die unit 120 may move or may be actuated with respect to the second press ram 112 when the tooth forming die unit 120 is opened to facilitate disengagement of the set of teeth 28 from the second tooth forming die portion 126. For example, teeth such as hypoid or spiral teeth may not be aligned with the die draw direction and may therefore inhibit removal of the forged part from the second tooth forming die portion 126. The forged part may be removed by rotating the second tooth forming die portion 126 about the tooth forming die assembly axis 132 to disengage or unscrew the second tooth forming die portion 126 from the set of teeth 28. The second tooth forming die portion 126 may be rotated while the second press ram 112 is being retracted or while separating the first tooth forming die portion 124 from the second tooth forming die portion 126. In addition, the forged part may be held in a stationary position in or with respect to the first tooth forming die portion 124 when the second tooth forming die portion 126 is rotated to help disengage or unscrew the second tooth forming die portion 126 from the set of teeth 28. It is also contemplated that the first tooth forming die portion 124 could be rotated with respect to the second tooth forming die portion 126 to help disengage or unscrew the teeth 28 of the forged part in one or more embodiments.

The ejector pin 136 and kickout pin 142 may be actuated to push the forged part out of the first tooth forming die portion 124 and the second tooth forming die portion 126, respectively. For example, the kickout pin 142 may be actuated while the second tooth forming die portion 126 is rotated and the ejector pin 136 may be actuated after the set of teeth 28 and the second tooth forming die portion 126 are disengaged. In addition, the ejector pin 136 may be extended while the second press 44 is being opened or after the second press 44 is fully opened. The forged part may fall onto the conveyor 150 when ejected from the tooth forming die unit 120. Alternatively, the forged part may be transferred from the tooth forming die unit 120 to the conveyor 150 with a manipulator, such as a robotic manipulator that may have an end effector configured as a gripper for grasping the forged part.

At block 208, the forged part may be cooled in the controlled cooling unit 152. For example, the controlled cooling unit 152 may maintain the temperature of the forged part within a predetermined temperature range for a predetermined time as previously discussed.

Figure 5:
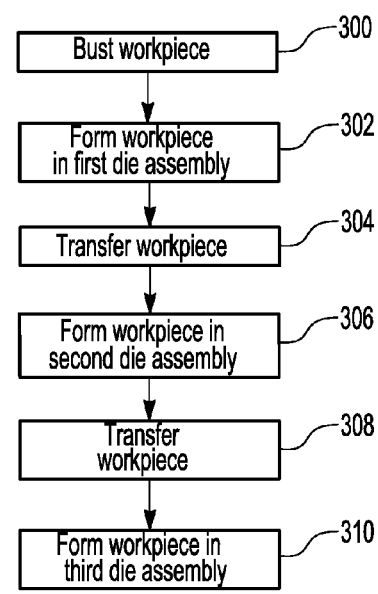
FIG. 5 is a flowchart of method steps that may be conducted when forming a workpiece with the first press.

Referring to FIG. 5, a flowchart is shown that shows steps that may be performed to form or forge the workpiece in the first press 42 and the first die unit 60.

At 300, the workpiece may be busted with the billet bust portion 62 as previously discussed. After busting, the workpiece may be transferred from the billet bust portion 62 to the first die assembly 64 with a manipulator, such as a robotic manipulator that may have an end effector configured as a gripper for grasping the workpiece.

At 302, the workpiece may be formed or forged in the first die assembly 64. For example, the workpiece may be positioned in the first die cavity 90 of the first die 80. The first punch 82 may then be actuated and the first die 80 and first punch 82 may cooperate to forge the workpiece from the workpiece configuration after busting (such as the exemplary configuration of the workpiece on the billet busting portion in FIG. 2) to a first configuration such as the configuration shown in FIG. 2. The first press ram 52 may then retract the first die 80 to facilitate removal of the workpiece from the first die 80 and one or more ejector pins 96 may be actuated to push the workpiece at least partially out of the first die 80.

At block 304, the workpiece may be transferred to the second die 80' in any suitable manner, such as with a manipulator like a robot that may have an end effector configured as a gripper for grasping the workpiece.

At block 306, the workpiece may be formed or forged in the second die assembly 66. For example, the workpiece may be positioned in the second die cavity 90' of the second die 80'. The second punch 82' may then be actuated and the second die 80' and second punch 82' may cooperate to forge the workpiece from the first configuration to a second configuration or the configuration shown in FIG. 2. The first press ram 52 may then retract the second die 80' to facilitate removal of the workpiece from the second die 80' and one or more ejector pins 96' may be actuated to push the workpiece at least partially out of the second die 80'.

At block 308, the workpiece may be transferred to the third die 80" in any suitable manner, such as with a manipulator like a robot that may have an end effector configured as a gripper for grasping the workpiece.

At block 310, the workpiece may be formed or forged in the third die assembly 68. For example, the workpiece may be positioned in the third die cavity 90" of the third die 80". The third punch 82" may then be actuated and the third die 80" and third punch 82" may cooperate to forge the workpiece from the second configuration to a third configuration or the configuration shown in FIG. 2. The first press ram 52 may then retract the third die 80" to facilitate removal of the workpiece from the third die 80" and one or more ejector pins 96" may be actuated to push the workpiece at least partially out of the third die 80".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a forged part comprising:
   forming a workpiece into a toothless drive pinion that has a stem and an enlarged head that extends from the stem with a first die unit that is disposed in a first press that has a press bolster and a press ram that is moveable with respect to the press bolster,
   wherein the first die unit has a first die assembly that has a first die and a first punch, a second die assembly that has a second die and a second punch, and a third die assembly that has a third die and a third punch, the first punch, the second punch, and the third punch being disposed on the press ram, wherein the first punch engages the workpiece to form a protrusion hub at an end of the workpiece, the protrusion hub being formed inside a first punch cavity of the first punch that is received inside the first die, the second punch receives the protrusion hub in a second punch cavity of the second punch that is received inside the second die, and the third die is partially received inside a third punch cavity of the third punch, wherein the third punch cavity receives the protrusion hub and forms the enlarged head adjacent to the protrusion hub;

transferring the toothless drive pinion from the first die unit to a tooth forming die unit that is disposed in a second press; and forming the toothless drive pinion into the forged part by forming a set of teeth on the enlarged head with the tooth forming die unit.

2. The method of claim 1 wherein the enlarged head has a tapered conical configuration.

3. The method of claim 1 wherein the tooth forming die unit has a first tooth forming die portion and a second tooth forming die portion, wherein the first tooth forming die portion receives the stem and the second tooth forming die portion receives the enlarged head and forms the set of teeth on the enlarged head.

4. The method of claim 3 wherein the first tooth forming die portion does not form the stem.

5. The method of claim 3 wherein the set of teeth have a hypoid configuration.

6. The method of claim 3 wherein the forged part is removed from the tooth forming die unit by rotating the second tooth forming die portion to disengage the second tooth forming die portion from the set of teeth while separating the first tooth forming die portion from the second tooth forming die portion.

7. The method of claim 6 wherein the forged part is held in a stationary position with respect to the first tooth forming die portion when the second tooth forming die portion is rotated.

8. A method of making a forged part comprising:

forming a workpiece into a toothless drive pinion that has a stem and an enlarged head that extends from the stem with a first die unit that is disposed in a first press that has a press bolster and a press ram that is moveable with respect to the press bolster, wherein the first die unit has a first die assembly that has a first die and a first punch, a second die assembly that has a second die and a second punch, and a third die assembly that has a third die and a third punch, the first punch, the second punch, and the third punch being disposed on the press ram, wherein the first punch engages the workpiece to form the enlarged head at an end of the workpiece, the enlarged head being formed inside a first die cavity when a portion of the first punch is received inside the first die, the second die receives the enlarged head in a second die cavity and cooperates with the second punch to further form the enlarged head with a portion of the second punch that is received inside the second die, and the third die is partially received inside a third punch cavity of the third punch, wherein the third punch cavity receives and further forms the enlarged head;

transferring the toothless drive pinion from the first die unit to a tooth forming die unit that is disposed in a second press; and forming the toothless drive pinion into the forged part by forming a set of teeth on the enlarged head with the tooth forming die unit.

9. The method of claim 8 wherein the enlarged head has a tapered conical configuration.

10. The method of claim 8 wherein the tooth forming die unit has a first tooth forming die portion and a second tooth forming die portion, wherein the first tooth forming die portion receives the stem and the second tooth forming die portion receives the enlarged head and forms the set of teeth on the enlarged head.

11. The method of claim 10 wherein the first tooth forming die portion does not form the stem.

12. The method of claim 10 wherein the set of teeth have a hypoid configuration.

13. The method of claim 10 wherein the forged part is removed from the tooth forming die unit by rotating the second tooth forming die portion to disengage the second tooth forming die portion from the set of teeth while separating the first tooth forming die portion from the second tooth forming die portion.

14. The method of claim 13 wherein the forged part is held in a stationary position with respect to the first tooth forming die portion when the second tooth forming die portion is rotated.

15. The method of claim 8 wherein the first press closes the first die assembly, the second die assembly, and the third die assembly during an extending stroke and the first press opens the first die assembly, the second die assembly, and the third die assembly during a retracting stroke.

* * * * *